(12) United States Patent
Mayer et al.

(10) Patent No.: US 10,330,769 B1
(45) Date of Patent: Jun. 25, 2019

(54) METHOD AND APPARATUS FOR GEOLOCATING EMITTERS IN A MULTI-EMITTER ENVIRONMENT

(71) Applicant: The Boeing Company, Chicago, IL (US)

(72) Inventors: Tanya G. Mayer, Hagerstown, MD (US); Eric M. Monsler, Belmont, CA (US)

(73) Assignee: THE BOEING COMPANY, Chicago, IL (US)

( * ) Notice: Subject to any disclaimer, the term of this patent is extended or adjusted under 35 U.S.C. 154(b) by 437 days.

(21) Appl. No.: 15/174,799

(22) Filed: Jun. 6, 2016

(51) Int. Cl.
   *G01S 5/04* (2006.01)
(52) U.S. Cl.
   CPC ..................... *G01S 5/04* (2013.01)
(58) Field of Classification Search
   CPC .................. G01S 5/04; G01S 5/0278
   See application file for complete search history.

(56) References Cited

U.S. PATENT DOCUMENTS

| | | | | |
|---|---|---|---|---|
| 5,379,047 A * | 1/1995 | Yokev | ....................... | G01S 5/04 342/457 |
| 5,389,936 A * | 2/1995 | Alcock | ..................... | G01S 5/04 342/450 |
| 6,763,099 B1 * | 7/2004 | Blink | ................... | H04M 3/002 379/189 |
| 7,804,448 B2 | 9/2010 | Bull et al. | | |
| 8,723,730 B2 | 5/2014 | Lu et al. | | |
| 8,791,859 B2 | 7/2014 | Larson | | |
| 8,878,726 B2 | 11/2014 | Lu | | |
| 2013/0120192 A1 * | 5/2013 | Larson | ...................... | G01S 5/04 342/386 |

OTHER PUBLICATIONS

"Xiaolin Wu's line algorithm", Wikipedia, last accessed Jul. 11, 2016. https://en.wikipedia.org/wiki/Xiaolin_Wu%27s_line_algorithm.
Driscoll, J. A., "Fixed-Wing Survey Drone—Functional Description and System Block Diagram", Oct. 1, 2013.
Wangsness, Dennis L., "A New Method of Position Estimation Using Bearing Measurements", IEEE Transactions on Aerospace and Electronic Systems, vol. AES-9, Issue 6, pp. 959-960, Nov. 1973.

\* cited by examiner

*Primary Examiner* — Bernarr E Gregory
*Assistant Examiner* — Fred H Mull
(74) *Attorney, Agent, or Firm* — Gates & Cooper LLP (57) ABSTRACT

A method and apparatus for geolocating emitters in a multi-emitter environment is disclosed. A number of lines of bearing (LOBs) associated with emitters of particular signal characteristics are determined, and a peak where the greatest number of such LOBs intersect is identified. A group of the LOBs that are within a distance threshold of the identified peak identified and used to locate a first emitter. The first group of LOBs are then excluded from consideration, facilitating the easier identification of a second peak where the greatest number of residual LOBs intersect. Residual LOBs within a threshold distance of the second peak are identified, and used to identify the second emitter, and the process is repeated until satisfactory results are obtained.

20 Claims, 9 Drawing Sheets

METHOD AND APPARATUS FOR GEOLOCATING EMITTERS IN A MULTI-EMITTER ENVIRONMENT

BACKGROUND

1. Field

The present disclosure relates to systems and methods for determining the location of emitters in an operational space, and in particular to a system and method for determining the location of multiple emitters having indistinguishable non-spatial signal characteristics.

2. Description of the Related Art

Passive geolocation of ground emitters is commonly performed by collection platforms such as surveillance aircraft using direction finding (DF) angles. These angles define the line-of-sight (LOS) from the aircraft to the emitter and are computed using the response of an antenna array on the aircraft to the emitter's RF signal. Systems that depend entirely upon DF angles for geo-location often convert each DF angle measurement to a direction of arrival (DOA) angle measurement and use these converted measurements for geolocation. DOA is the angle equivalent to antenna azimuth when defined relative to a local-level coordinate frame at the current aircraft position. DOA is computed using antenna azimuth, an estimate of the elevation angle to the target, the antenna array mounting angles on the aircraft, and aircraft navigation system output. Associated with each angle measurement is a Line-of-Bearing (LOB) that is computed from received RF energy at a collection platform, and represents the platform position of receipt and measured direction of received energy.

LOBs are computed and stored with the goal of using intersecting LOBs to compute the geolocation of the emitter. This can be accomplished using multiple surveillance platforms at different locations, using motion of a single surveillance platform over time (a typical operational scenario), or a combination of both.

For the simple case of one emitter, or of multiple LOBs filtered down to a single emitter by frequency, bandwidth, or other signal characteristics, the LOBs intersect in one location and the geolocation of the emitter can be computed in a number of relatively straightforward methods.

However, when there are multiple emitters in the operational space that cannot be discriminated by signal characteristics, the LOBs are clustered such that they belong to the same emitter prior to computing the geolocation. Geolocation performance is typically degraded in a dense emitter environment due to the difficulty of correlating each LOB with the correct target emitter, and preventing the geolocation of numerous false or "ghost" targets.

What is needed is a system and method for performing emitter geolocation in emitter-rich environments. The methods and systems described herein satisfy that need.

SUMMARY

To address the requirements described above, this document discloses a system and method for determining locations of a plurality of signal sources using at least one platform having a direction finding sensor. In one embodiment, the method comprises determining a plurality of lines of bearing, each of the plurality of lines of bearing extending from each direction finding sensor to the signal sources from at least two locations, determining a first peak disposed at a maximum number of intersecting determined lines of bearing, associating a first group of the determined lines of bearing with the first peak, determining a location of a first signal source of the plurality of signal sources according to the first group of the determined lines of bearing, determining a second peak disposed at a maximum number of intersecting residual determined lines of bearing, the residual determined lines of bearing excluding the first group of the determined lines of bearing, associating a second group of the residual determined lines of bearing with the second peak, and determining a location of the second signal source using the second group of the residual determined lines of bearing. In another embodiment, the system comprises a processor communicatively coupled to a memory storing instructions for performing the foregoing operations. Still another embodiment is evidenced by a control system configured to perform such operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

Existing geolocation techniques (implemented by geolocation engines) may assume that the LOBs presented are all associated with a single emitter. When multiple emitters are present, these existing geolocation engines return a minimum least squares result, which represents the centroid of emitter locations which does not accurately represent any of the emitter locations.

The systems and method disclosed herein address the foregoing multi-emitter situation by determining a number of LOBs associated with emitters of particular signal characteristics, identifying a peak where the greatest number of such LOBs intersect, identifying a group of the LOBs that are within a distance threshold of the identified peak, and identifying a first emitter from that first group of LOBs. The first group of LOBs are then excluded from consideration, facilitating the easier identification of a second peak where the greatest number of residual LOBs intersect. Residual LOBs within a threshold distance of the second peak are identified, and used to identify the second emitter, and the process is repeated until satisfactory results are obtained.

Geolocation

Figure 1:
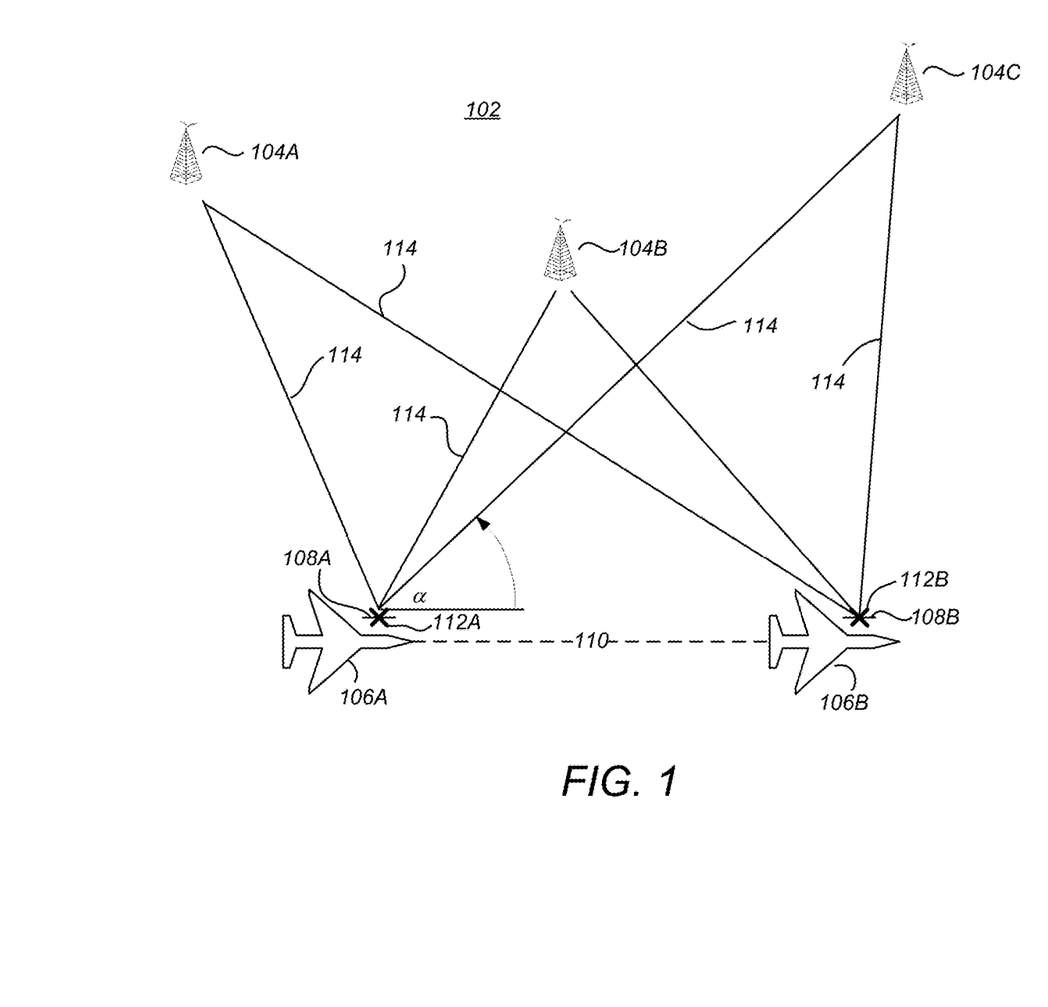
FIG. 1 is a diagram illustrating passive geolocation via one or more surveillance platforms.

FIG. 1 is a diagram illustrating passive geolocation via one or more surveillance platforms. In the illustrated embodiment, the operational space 102 includes three emitters 104A, 104B, and 104C (hereinafter alternatively referred to as emitter(s) 104). Each of the surveillance platforms 106A and 106B (hereinafter alternatively referred to as surveillance platform(s) 106) include a direction finding sensor 108A and 108B, respectively (hereinafter alternatively referred to as direction finding sensor(s) 108) that can be used to determine DF angles ($\alpha$) in azimuth from a datum of the surveillance platform 106 to the emitter 104 at particular points in time. In one embodiment, the direction finding sensors 108 are radio frequency (RF) sensors that sense RF signals from the emitters 104. In other embodiments, the direction finding sensors 108 may comprise infrared (IR) sensors or sensors operating in other frequency regimes.

Although FIG. 1 depicts the use of two surveillance platforms 106A and 106B, analogous results may be obtained with a single surveillance platform 106 flying from a first location 112A to a second location 112B on flight path 110. Also, a hybrid system comprising stationary and moving surveillance platforms 106 can also be used.

DF angles are computed from the estimates of the orientation of the direction finding sensors 108 in inertial space, the elevation and azimuth angle from the direction finding sensor 108 to the emitter 104, mounting angles of the direction finding sensors 108 to the surveillance platforms 106, and navigation data of the surveillance platform 106. Those DF angles are used to compute the LOBs 114 as further described below.

Figure 2:
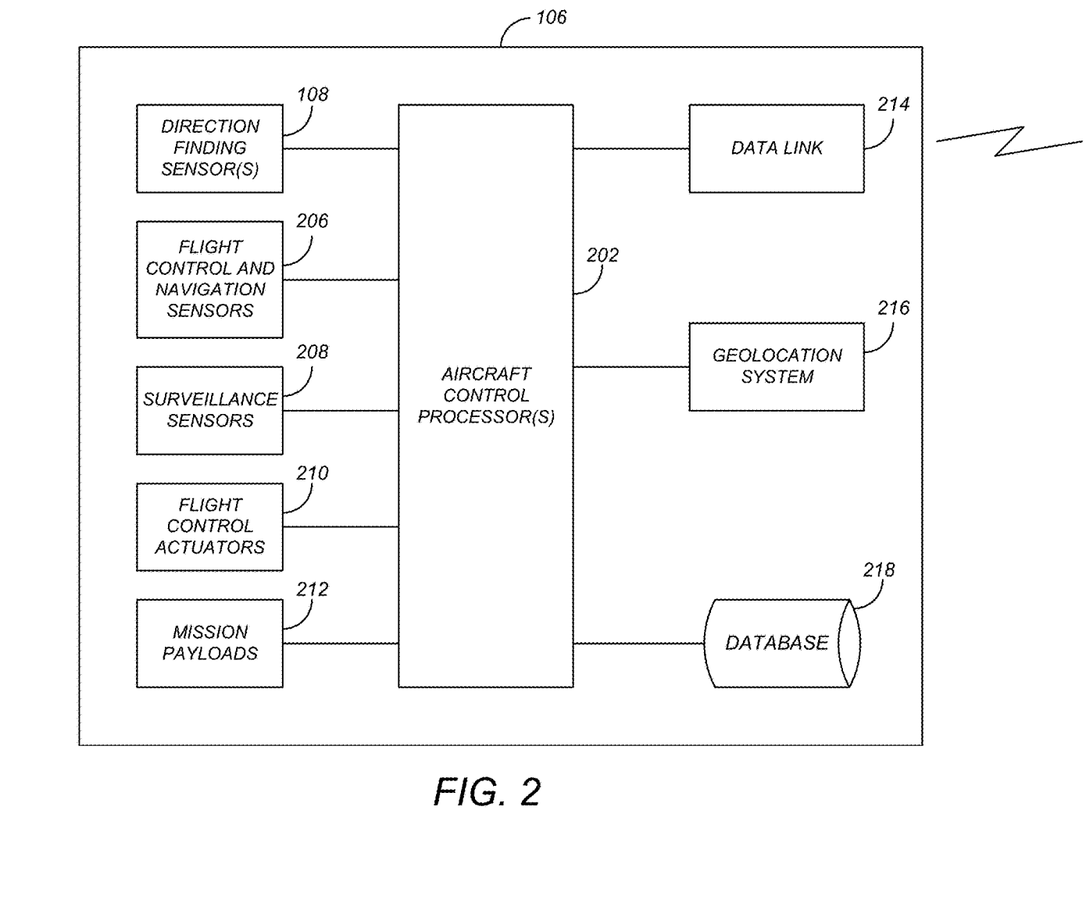
FIG. 2 presents a functional block diagram of one embodiment of a surveillance platform.

FIG. 2 presents a functional block diagram of one embodiment of a surveillance platform 106. The surveillance platform 106 includes a control processor 202 communicatively coupled to the direction finding sensor(s) 108, flight control and navigation sensors 206, surveillance sensors 208, flight control actuators 210, one or more mission payloads 212, a data link 214 and one or more databases 218. The control processor 202 is also communicatively coupled to a geolocation system 216 further described in this disclosure. The aircraft control processor 202 is also communicatively coupled to a memory storing instructions which, when performed by the aircraft control processor 202, perform the operations described herein below.

The flight control and navigation sensors 206 typically comprise an inertial reference unit (IRU), which includes acceleration sensors such as accelerometers and angular rate sensors such as gyros. These sensors 206 have sensitive axes that are disposed in mutually orthogonal directions, which permit measurements in any combination of directions and axes of rotation. The data from these sensors 206 are provided to the aircraft control processor 202, which uses this data to compute commands to the flight control actuators 210. The flight control actuators 210 move control surfaces or other control elements such as flaps, slats, elevators, ailerons, and/or rudders to steer the surveillance platform 106 along a desired path. In the case of a piloted surveillance platform, the desired path is provided by human input into the aircraft control processor 202. This human input may be provided by a pilot disposed on the surveillance platform, or a remote pilot providing such commands from a remote location via the data link 214. In other embodiments, the desired path may be provided by a flight program that is loaded into memory before launching the surveillance platform 106. This flight program may be modified in-flight by commands from data link 214.

Data link 214 also provides information to the aircraft control processor 202 to remote locations. Such data may include surveillance data collected by the surveillance sensors 208 or mission payloads 212.

The surveillance platform 106 includes surveillance sensors 208 which allow the surveillance platform 106 to collect surveillance data in one or more energy spectrums (for example, RF, IR, visible light, or ultraviolet (UV)). This surveillance data may be provided to remote locations via data link 214, and may be pre-processed before such provision by the aircraft control processor 202.

In one embodiment, the surveillance sensors 208 provide direction finding information to the aircraft control processor 202. However, in other embodiments, dedicated direction finding sensors 108 are used either in the alternative or in addition to the surveillance sensors 208 to determine the direction of emitters 104 in the operational space 102.

In one embodiment, the surveillance platform 106 includes a memory communicatively coupled to the aircraft control processor 202 that stores a database 218 of information used to perform the missions of the surveillance platform 106. Such data includes, for example, data regarding potential emitters 104 in the operational space 102 (e.g. expected emitter locations, and signal characteristics) as well as data regarding the operational space (e.g. terrain data). This data is used by a geolocation engine implemented by the geolocation system 216 and/or the aircraft control processors 202 to compute the locations of the emitters 104 as described further below. Although the geolocation system 216 is illustrated separate from the aircraft control processor 202 and includes its own processor and memory storing instructions, the geolocation system 216 may instead be implemented by the aircraft control processor 202.

While the geolocation system 216 is illustrated as a part of the surveillance platform 106 in FIG. 2, the geolocation system 216 may be remote from the surveillance platform 106. For example, the geolocation system 216 may be disposed on the ground, and communicate with the aircraft control processor(s) 202 via data link 214.

Figure 3:
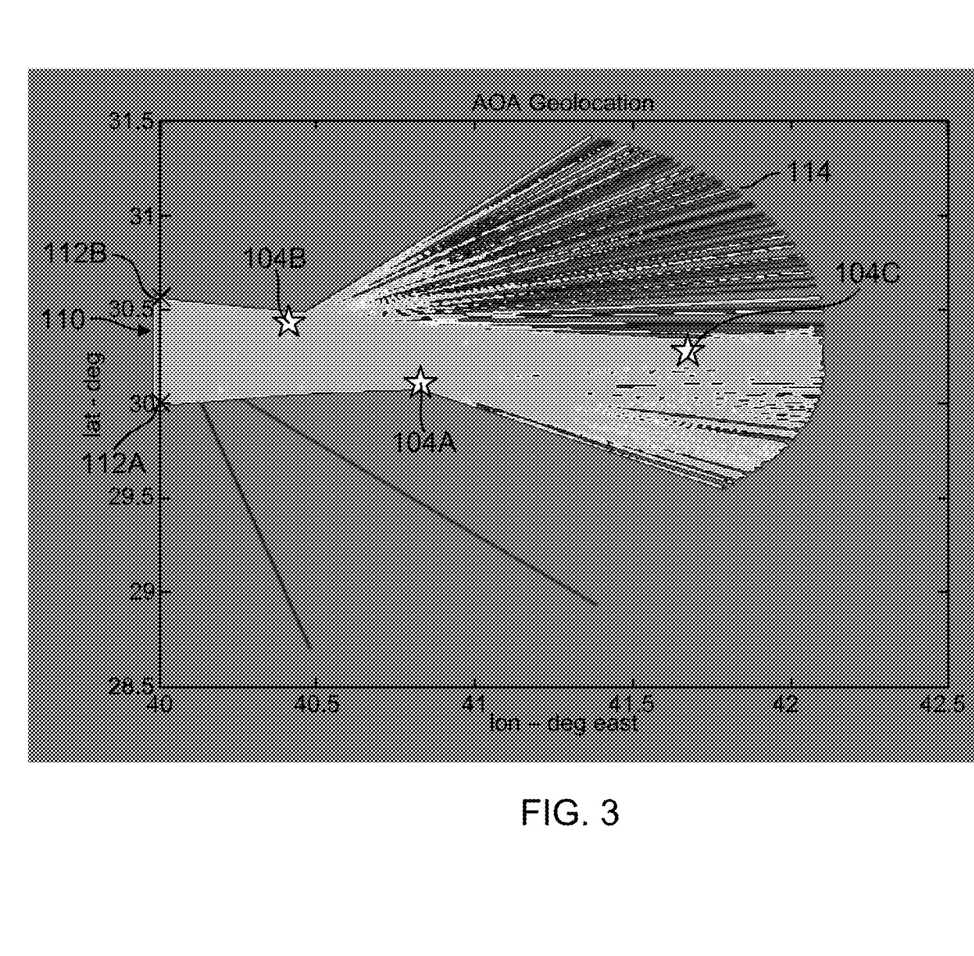
FIG. 3 is a diagram presenting an exemplary plot of a locus of LOBs in a multiple emitter environment for a surveillance platform moving from a first location to a second location.

FIG. 3 is a diagram presenting an exemplary plot of a locus of LOBs 114 in a multiple emitter 104 environment for a surveillance platform 106 moving from location 112A to location 112B. The flight path 110 of the surveillance platform 106 includes multiple locations between location 112A and 112B as indicated by the line along the left side of the graph with a north-south orientation. Each line 114 represents a determined LOB associated with a particular location on the flight path 110. Multiple LOBs 114 may be generated at each platform location 112A, 112B. FIG. 3 also depicts the location (in latitude and longitude) of three (starred) ground truth (actual) emitter locations 104A, 104B and 104C.

Exemplary Process

Figure 4A:
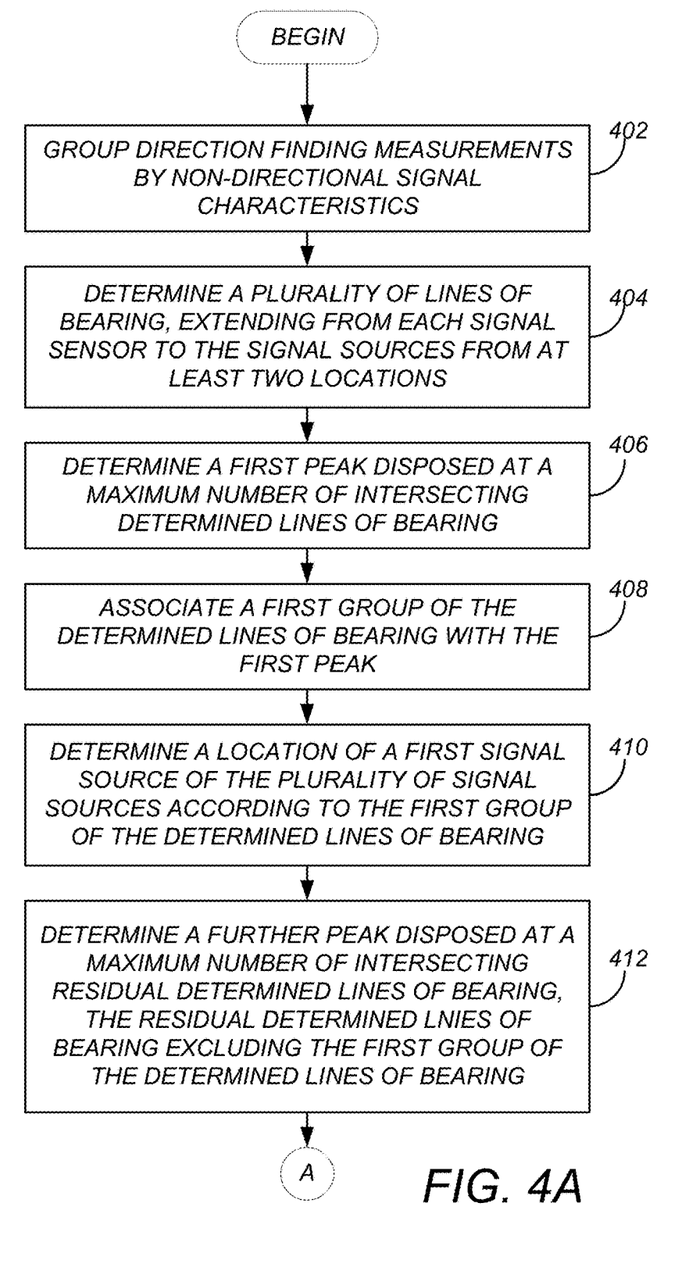
FIGS. 4A-4B are diagrams presenting illustrative operations for determining the locations of a plurality of signal sources using at least one surveillance platform having direction finding sensor(s)
Figure 4B:
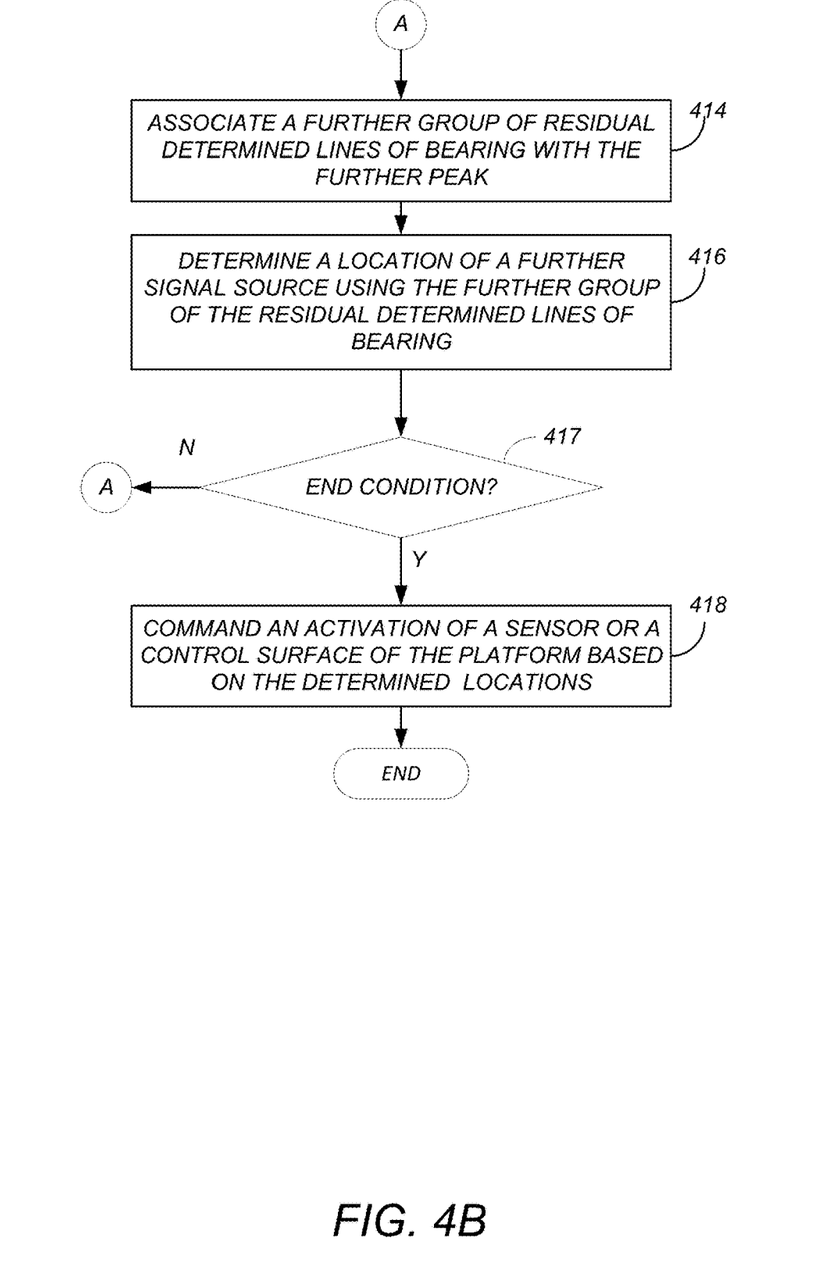

FIGS. 4A-4B are diagrams presenting illustrative operations for determining the locations 104 of a plurality of signal sources using at least one surveillance platform 106 having direction finding sensor(s) 108.

Direction finding (DF) measurements (e.g. from direction finding sensors 108) are grouped by signal externals (e.g. signal parameters other than the perceived direction of the signal), as shown in block 402. Optionally, grouped DF measurements can be filtered to exclude those above a particular depression angle threshold (for example, 40 degrees) and those above the radio horizon. Then a plurality of lines of bearing (LOB) 114 are determined for the grouped DF measurements, as shown in block 404. Each LOB 114 extends from each direction finding sensor 108 to each signal source 104 from at least two locations 112. Each determined LOB 114 is defined as an azimuth bearing from a datum direction (for example, clockwise from North), and has an associated latitude, longitude, and elevation, and represent a line projected on the ground. LOBs may be described in terms of a first (e.g. starting) latitude and longitude and a second (e.g. ending) latitude and longitude.

In one embodiment, each LOB 114 may also be associated with a weight, thus allowing some LOBs 114 to be given a greater weight than other LOBs 114. This may be useful if the measurements used to determine some LOBs are more accurate or otherwise more desirable than the measurements used to determine other LOBs. The weighting of the determined LOBs allows a better quality LOB to be given greater weight than a lower quality LOB, which is given less weight.

For example, an LOB 114 may be weighted more heavily if the signal used to determine the DF and hence, the LOB 114 has a higher signal to noise ratio (SNR) than the signal used to determine other LOBs 114. Or, in another example, a plurality of DF measurements may be taken for an emitter (e.g. by dwelling on the emitter and taking multiple cuts). Statistical measures of these cuts may be taken and used to generate the LOB 114 and can also be used to determine LOB weight. For example, in one embodiment, the statistical measures include the mean of the DF measurement cuts and the standard deviation or variance of the DF measurement cuts. The mean of the DF measurement cuts is used generate an azimuth value for the LOB 114, and the standard deviation of the azimuth cuts is used to determine the weight, with the weight inversely proportional to the standard deviation. Thus, the more closely grouped the DF measurement cuts are, the more confidence is ascribed to the LOB 114 and the LOB 114 is given greater weight. Other embodiments weight the LOBs 114 by other parameters such as apriori knowledge of the DF sensor 108 accuracy or the location of the emitters 104

Figure 5:
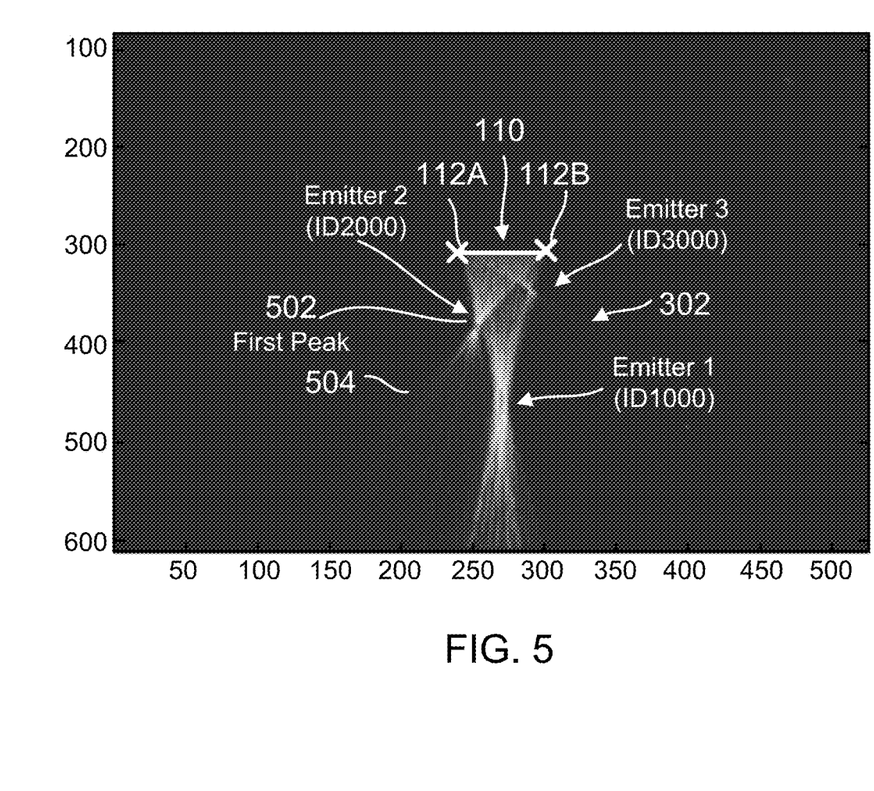
FIG. 5 is a diagram illustrating exemplary determined LOBs.

FIG. 5 is a diagram illustrating exemplary LOBs 114 determined as described in block 404. This presents the same scenario as originally presented in FIG. 3, although the scene has been rotated by 90 degrees clockwise and has been rescaled so that each pixel represents one kilometer (Km). Here, the surveillance platform 106 is shown in an east-west (left to right) flight path and each LOB 114 is drawn as a line. The surveillance platform 106 positions are not explicitly shown, but are closely represented by the points of the LOBs 114 along the horizontal axis of the graph. LOBs 114 are generated at a plurality of locations along the flight path 110 as the surveillance platform 106 flew from location 112A to location 112B. Each of the LOBs 114 intersects other LOBs 114, and there are regions in which a greater number of LOBs intersect other LOBs in the same space. The number of intersecting lines of LOB in the region is indicated by the density of lines in that region. In the embodiment shown in FIG. 5, the greatest number of intersecting LOBs occurs at location 502, thus representing an emitter 104 geolocation. Other emitter locations are also illustrated, but they are shown with fewer intersecting lines.

Returning to FIG. 4A, block 406 determines a first peak disposed at a maximum number of intersecting LOBs 114. In the example depicted in FIG. 5, this first peak is disposed at location 502 (and is referred to hereinafter as first peak 502).

Next, a first group of the determined LOBs 114 is associated with the first peak 502, as shown in block 408. In one embodiment, the first group of LOBs 114 that are associated with the first peak are defined as those LOBs 114 that are a minimum threshold distance from the determined lines of bearing 114 to the first peak 502. In other words, the first group of LOBs includes the LOBs 114 that are less than a threshold distance away from the first peak 502 at the closest point of the LOB 114 to the peak. In one embodiment, this is accomplished by computing the closest point of approach of each of the LOBs, computing a value for the threshold distance, then comparing the threshold distance with the closest point of approach of each of the LOBs. LOBs having a closest point of approach less than the computed threshold distance are associated with the first group, while LOBs having a closest point of approach greater than or equal to the computed threshold distance are not associated with the first group.

In one embodiment, the aforementioned threshold distance is a pre-determined value (such as 1 kilometer (Km)). In another embodiment, the threshold distance is determined according to the geometry between the emitters 104 and the surveillance platforms 106. For example, the range from the surveillance platforms 106 to the emitters 104 may be used to determine an appropriate threshold distance. DF measurements made at closer ranges to the emitters 104 provide greater angular diversity and are subject to reduced error when compared to DF measurements made at greater ranges, and in such cases, a reduced threshold distance will be selected. Similarly, DF measurements made at greater ranges to the emitters 104 provide less angular diversity and are subject to greater error than DF measurements made at reduced ranges to the emitters 104, and a greater threshold distance may be selected to assure that the appropriate LOBs are excluded while including the appropriate LOBs. These threshold distances may also be iteratively optimized (e.g. the process of determining the number and location of the emitters 104 performed given a predicted best estimate (based upon range, for example), incrementing the threshold distance, and re-determining the number and location of the emitters 104, and selecting new threshold distances based upon the results).

Next, the location of the first signal source 104 is determined according to the first group of LOBs, as shown in block 410. In one embodiment, this is accomplished by presenting the first group of LOBs to the geolocation engine of the geolocation system 216. The geolocation engine uses the first group of LOBs to determine the location 104 of the first signal source. In the illustrated embodiment shown in FIG. 5, this is the location of emitter 1, located at the first peak 502.

Returning to FIG. 4A, a second peak at the maximum number of intersecting residual LOBs that exclude the first group of LOBs is determined, as shown in block 412. This is accomplished by removing the first group of LOBs (those associated with the highest peak 502) to create a residual group of LOBs that excludes the first group of LOBs, and determining the second peak from the residual group of LOBs. Removing the first group of LOBs allows the system to determine the location of multiple emitters.

Figure 6:
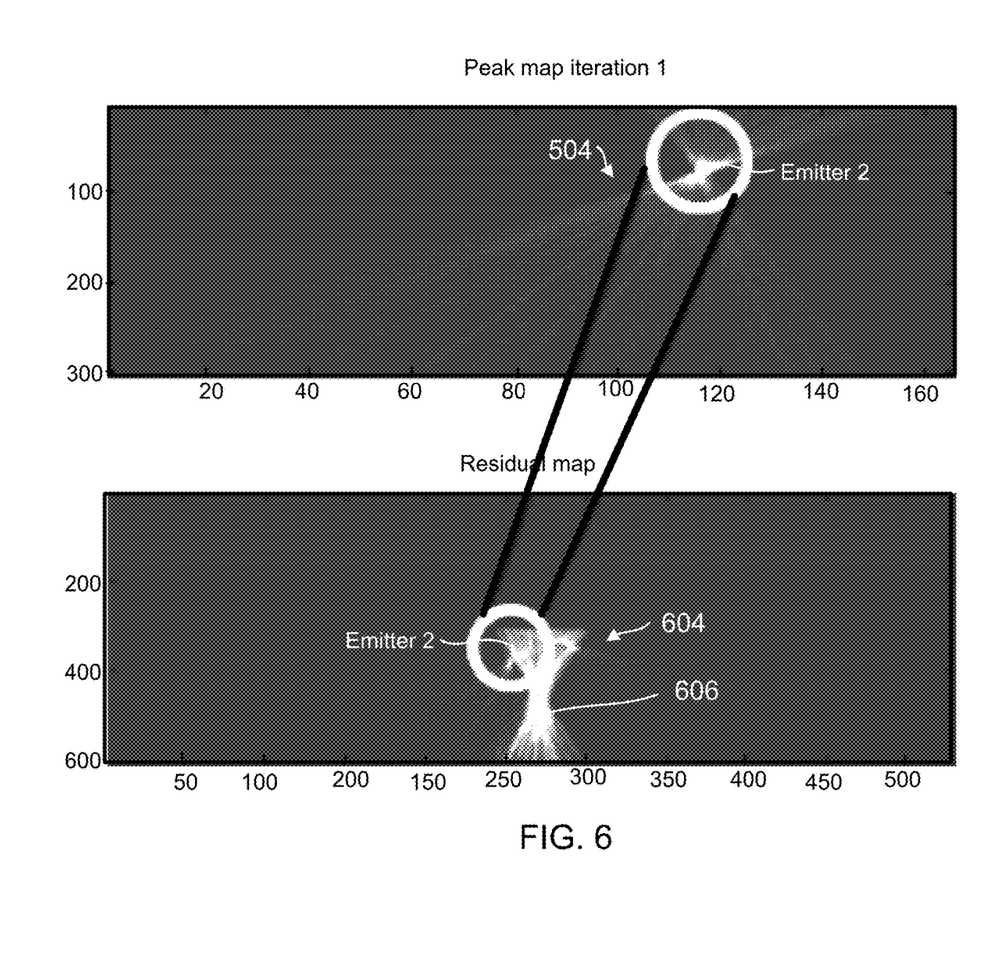
FIG. 6 is a diagram illustrating residual LOBs obtained after removal of a first group of LOBs, and showing one embodiment of how the second peak may be determined.

FIG. 6 is a diagram illustrating residual LOBs 504 after the first group of LOBs 602 shown in FIG. 5 has been removed, and showing one embodiment of how the second peak may be determined. The upper plot of FIG. 6 illustrates the first group of LOBs 602 (those associated with the highest peak 502). The lower plot of FIG. 6 illustrates the LOBs remaining after the first group of LOBs 114 are removed (e.g. the residual LOBs 604). Eliminating the first group of LOBs 602 significantly reduces the number of intersecting LOBs associated with the first peak 502. This is illustrated by the reduced intensity (reflecting fewer intersecting LOBs) of in the region of the first peak (labeled Emitter 2) in the lower portion of FIG. 6 when compared to the non-residual map shown in FIG. 5. This reduced intensity allows the second peak 606 to be more accurately determined.

Referring to FIG. 4B, a second group of the residual LOBs 604 associated with the second peak 606 is determined, as shown in block 414. In one embodiment, this is accomplished in a manner analogous to the process used to associate the first group of residual LOBs 602. That is, the residual LOBs 604 are determined to be associated with the second peak 606 based upon a second minimum threshold distance from the residual determined lines of bearing to the second peak. Then, the location of the second signal source is determined using the second group of residual LOBs 604.

The foregoing process is iteratively repeated (i.e. iteratively removing the LOBs associated with the peak of the residual LOBs to identify further residual LOBs, identifying a further peak associated with the further residue LOBs, associating a further group of the further residual LOBs with the identified further peak, then locating the next signal source according to the further group of further residual LOBs). This process continues until a particular processing state has been achieved. In one embodiment, this processing state is defined by a number of iterations (for example, the process completes for 10 iterations). In another embodiment, the processing state is defined by the number of residual LOBs remaining after the latest iteration (for example, 6 LOBs).

In one embodiment, the foregoing processes are implemented by use of a two dimensional cumulative map such as a histogram having an array of pixels. In this embodiment, once the LOBs are determined, they are plotted on the histogram such that when the LOB intersects an area of the pixel, a unit (optionally weighted as described above with respect to the weighted LOBs) is recorded for that pixel. Intersections of other LOBs with the pixel are tallied and the results for all LOBs under consideration are accumulated.

In an optional embodiment based on the histogram/pixel solution, the aforementioned plotted LOBs comprise Wu lines. Wu lines are lines drawn using an anti-aliasing algorithm described in "An Efficient Antialiasing Technique," published in Computer Graphics, (July 1991), hereby incorporated by reference herein. The technique draws pairs of pixels straddling the LOB, each colored or shaded according to its distance from the line, with the result that the lines appear smoothed. In a further optional embodiment, the two dimensional histogram is further smoothed using a 3×3 box car filter.

One advantage in the pixelated histogram technique is that it avoids the use of closed form solutions in order to identify the intersecting LOBs. This permits the size of the pixels to be adjusted to account for errors in the DF values used to generate the LOBs, thus controlling desired accuracy in determining peaks as well as emitter locations. Further, while the errors in determining intersecting lines must be accounted for in a vector solution (e.g. errors will generally prevent three lines intersecting in the same place in a vector formulation even if they are associated with the same emitter) the smoothing offered by the pixel boxes, Wu line definition, and boxcar filtering accounts for such errors.

Figure 7A:
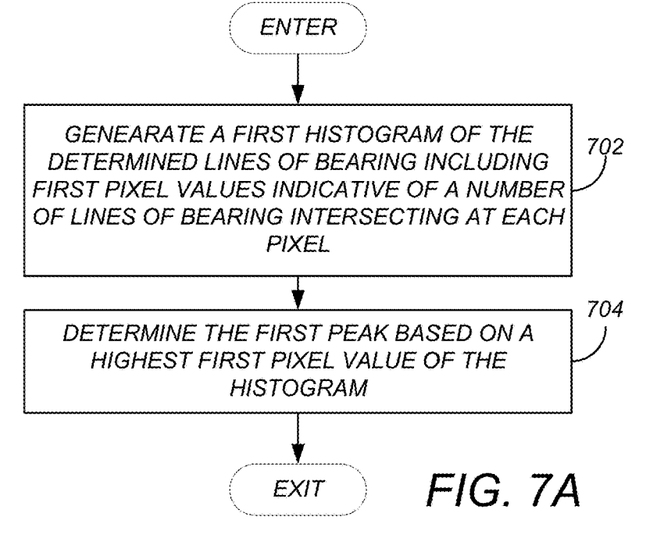
FIGS. 7A and 7B are diagrams illustrating one embodiment of the use of histograms having an array of pixels to perform geolocation.
Figure 7B:
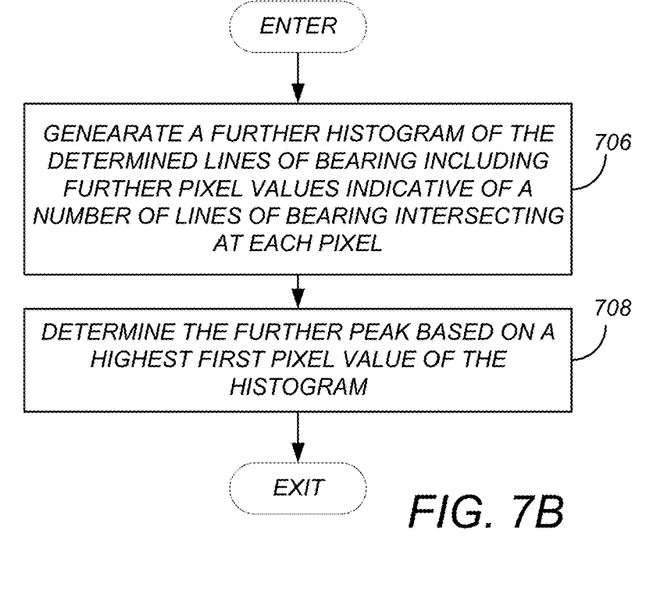

FIGS. 7A and 7B are diagrams illustrating one embodiment of the use of histograms having an array of pixels to perform the foregoing iterative processes of determining the peaks 502, 606, groups of LOBs 602, residual LOBs 504, and emitter locations 104. FIG. 7A illustrates one embodiment of how the operations of block 406 (determining the first peak disposed at a maximum number of intersecting LOBs) may be performed. In block 702, a first histogram of the determined LOBs is determined. The first histogram includes first pixel values indicative of a number of lines of bearing intersecting each pixel. In block 704, the first peak is determined as the pixel having the highest pixel value of the histogram. FIG. 7B illustrates a related embodiment of how the operations of block 412 (determining the second peak disposed at a maximum number of intersecting residual LOBs) may be performed. In block 706, a second histogram of the determined LOBs is determined. The second histogram includes second pixel values indicative of a number of lines of bearing intersecting each pixel. In block 708, the second peak is determined as the pixel having the highest pixel value of the histogram.

Using the foregoing process, it is possible to determine multiple geolocation results for the same type of signal source or emitter. This is typically seen when the emitter is of lower power, farther distance (or both), or the accuracy of the direction finding system is poor. This scenario results in a looser area of LOB peak intersection which may span more than one pixel. In this case a subsequent iteration would likely find a second geolocation associated with the same emitter as previously found. For these situations, geolocation merge rules that de-duplicate geolocation results are employed to forego reporting extraneous results.

In one embodiment, this is accomplished by merging iteration results within a specified distance of one another, for example, 10 Km. This distance can be modified to account for pre-existing knowledge regarding the location of the emitters (for example, that emitters are unlikely to be placed less than a particular distance apart), or modified based upon the result of the geolocation process (for example, a particular emitter location may be chosen over another nearby location based on the number or weighted number of LOBs intersecting at that location.

In another embodiment, this is accomplished by selecting the first emitter to be defined by the iterative process, and disregarding the second emitter.

Hardware Environment

Figure 8:
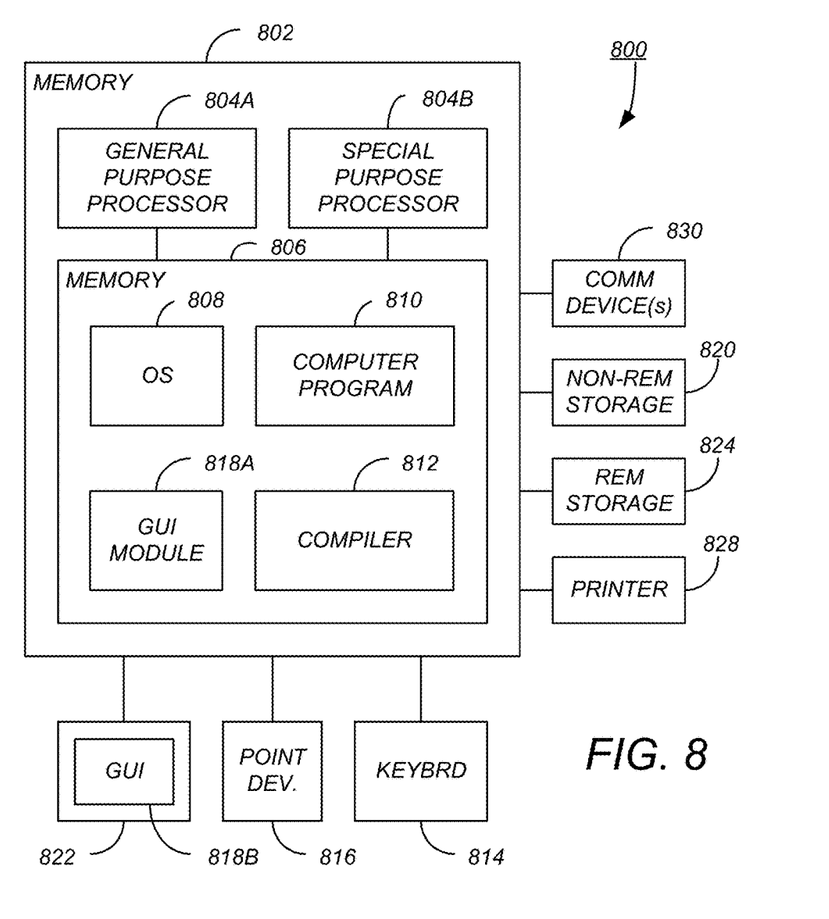
FIG. 8 illustrates an exemplary computer system that could be used to implement processing elements of the geolocation system.

FIG. 8 illustrates an exemplary computer system 800 that could be used to implement processing elements of the above disclosure, including the aircraft control processor 202 and geolocation system 216. The computer 802 comprises a processor 804 and a memory, such as random access memory (RAM) 806. The computer 802 is operatively coupled to a display 822, which presents images such as windows to the user on a graphical user interface 818B. The computer 802 may be coupled to other devices, such as a keyboard 814, a mouse device 816, a printer, etc. Of course, those skilled in the art will recognize that any combination of the above components, or any number of different components, peripherals, and other devices, may be used with the computer 802.

Generally, the computer 802 operates under control of an operating system 808 stored in the memory 806, and interfaces with the user to accept inputs and commands and to present results through a graphical user interface (GUI) module 818A. Although the GUI module 818B is depicted as a separate module, the instructions performing the GUI functions can be resident or distributed in the operating system 808, the computer program 810, or implemented with special purpose memory and processors. The computer 802 also implements a compiler 812 which allows an application program 810 written in a programming language such as COBOL, C++, FORTRAN, or other language to be translated into processor 804 readable code. After completion, the application 810 accesses and manipulates data stored in the memory 806 of the computer 802 using the relationships and logic that was generated using the compiler 812. The computer 802 also optionally comprises an external communication device such as a modem, satellite link, Ethernet card, or other device for communicating with other computers.

In one embodiment, instructions implementing the operating system 808, the computer program 810, and the compiler 812 are tangibly embodied in a computer-readable medium, which could include one or more fixed or removable data storage devices, such as a zip drive, floppy disc drive, hard drive, CD-ROM drive, or tape drive. Such computer-readable medium may be implemented in either no-removable (fixed) 820 or removable 824 storage devices. Further, the operating system 808 and the computer program 810 are comprised of instructions which, when read and executed by the computer 802, causes the computer 802 to perform the operations herein described. Computer program 810 and/or operating instructions may also be tangibly embodied in memory 806 and/or data communications devices 830, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure. In summary, a method and apparatus for locating emitters in a multi-emitter environment is described. Multiple target signals producing lines of bearing (LOBs) and having the same external signal characteristics are very challenging to correctly attribute to the correct emitter. This disclosure describes a process and system that represents the total collection of LOBs in 2D coordinates. A peak where the greatest optionally weighted number of LOBs intersect is determined, and the closest point of approach (CPA) from each LOB is computed to that peak. The CPA is thresholded against a user-defined distance and any LOB CPAs within that distance are considered associated with the same emitter. Those LOBs that are associated with that peak are then removed from consideration to define residual LOBs and a second peak is computed from the residual LOBs with the process is repeated. This enables LOBs from multiple targets to be found and associated across the same set of ambiguous data. In one embodiment, a Wu-Line anti-aliasing technique to form an effective ground histogram having a plurality of pixels, with the highest boxcar filtered values (peak) corresponding to the spatial location that has the most LOB intersections.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method for determining locations of a plurality of signal sources using at least one platform having a direction finding sensor, the method including:
   determining a plurality of lines of bearing, each of the plurality of lines of bearing extending from each direction finding sensor to the signal sources from at least two locations;
   determining a plurality of peaks, each of the plurality of peaks disposed at intersecting determined lines of bearing;
   identifying a first peak as one of the plurality of peaks that is disposed at a greatest number of intersecting determined lines of bearing;
   associating a first group of the determined lines of bearing with the first peak;
   determining a location of a first signal source of the plurality of signal sources according to the first group of the determined lines of bearing;
   creating a residual group of lines of bearing that excludes the first group of determined lines of bearing;
   identifying a second peak as another one of the plurality of peaks disposed at a greatest number of intersecting residual determined lines of bearing from the residual group of lines of bearing;
   associating a second group of the residual determined lines of bearing with the second peak; and
   determining a location of a second signal source using the second group of the residual determined lines of bearing.

2. The method of claim 1, further comprising:
   commanding an activation of a sensor or a control surface of the platform based on the determined location of the first signal source and the second signal source.

3. The method of claim 2, wherein the two locations are disposed along a movement path of the platform, and determining the plurality of lines of bearing comprises determining the lines of bearing by the direction finding sensor at the two locations.

4. The method of claim 2, wherein determining the plurality of lines of bearing, each of the lines of bearing extending from each direction finding sensor to the signal sources from at least two locations comprises:

determining the plurality of lines of bearing using a radio frequency (RF) direction finding sensor, each of the lines of bearing extending from each direction RF finding sensor to the signal sources from at least two locations.

5. The method of claim 1, further comprising:
associating the first group of the determined lines of bearing with the first peak based upon a first minimum threshold distance from the determined lines of bearing to the first peak;
associating the second group of the determined lines of bearing with the second peak based upon a second minimum threshold distance from the determined lines of bearing to the first peak.

6. The method of claim 5, further comprising adjusting the first minimum threshold distance and the second minimum threshold distance according to a range from the platform to the first signal source.

7. The method of claim 5, wherein:
each of the lines of bearing is weighted; and
identifying the first peak as one of the plurality of peaks that is disposed at a greatest number of intersecting determined lines of bearing comprises determining the first peak disposed at a greatest number of weighted intersecting determined lines.

8. The method of claim 5, wherein:
identifying the first peak as one of the plurality of peaks that is disposed at a greatest number of intersecting determined lines of bearing comprises:
generating a first histogram of the determined lines of bearing, the histogram including first pixel values indicative of a number of the lines of bearing intersecting at each pixel; and
determining a first peak based on a highest first pixel value of the histogram;
identifying the second peak as the another one of the plurality of peaks disposed at the greatest number of intersecting residual determined lines of bearing, the residual determined lines of bearing excluding the first group of the determined lines of bearing comprises:
generating a second histogram of determined lines of bearing excluding the first group of the determined lines of bearing, the second histogram including second pixel values indicative of a second number of lines of bearing excluding the first group of the determined lines of bearing intersecting at each pixel; and
determining a second peak based on a highest second pixel value of the second histogram.

9. The method of claim 8, further comprising associating each of the determined lines of bearing with a weighting factor, wherein the first pixel values are indicative of the number of lines of bearing and the weighting factor.

10. The method of claim 8, wherein generating a second histogram of determined lines of bearing excluding the first group of the determined lines of bearing comprises:
removing the first group of the determined lines of bearing from the determined lines of bearing; and
generating the second histogram from the determined lines of bearing remaining after removing the first group of the determined lines of bearing.

11. The method of claim 8, wherein generating a second histogram of determined lines of bearing excluding the first group of the determined lines of bearing comprises:
removing pixel values associated with the first group of the determined lines of bearing from the first pixel values.

12. A geolocation system for determining locations of a plurality of signal sources using at least one platform having a direction finding sensor, the system comprising:
a processor;
a memory communicatively coupled to the processor, the memory storing processor instructions comprising processor instructions for:
determining a plurality of lines of bearing, each of the plurality of lines of bearing extending from each direction finding sensor to the signal sources from at least two locations;
determining a plurality of peaks, each of the plurality of peaks disposed at intersecting determined lines of bearing:
identifying a first peak as one of the plurality of peaks that is disposed at a greatest number of intersecting determined lines of bearing;
associating a first group of the determined lines of bearing with the first peak;
determining a location of a first signal source of the plurality of signal sources according to the first group of the determined lines of bearing;
creating a residual group of lines of bearing that excludes the first group of determined lines of bearing;
identifying a second peak as another one of the plurality of peaks disposed at a greatest number of intersecting residual determined lines of bearing from the residual group of lines of bearing;
associating a second group of the residual determined lines of bearing with the second peak; and
determining a location of a second signal source using the second group of the residual determined lines of bearing.

13. The system of claim 12, wherein the instructions further comprise:
commanding an activation of a sensor or a control surface of the platform based on the determined location of the first signal source and the second signal source.

14. The system of claim 13, wherein the two locations are disposed along a movement path of the platform, and the instructions determining the plurality of lines of bearing comprise instructions for determining the lines of bearing by the direction finding sensor at the two locations.

15. The system of claim 13, wherein the plurality of signal sources comprise radio frequency (RF) signal sources and the direction finding sensor of the at least one platform is an RF sensor.

16. The system of claim 12, wherein:
the first group of the determined lines of bearing is associated with the first peak based upon a first minimum threshold distance from the determined lines of bearing to the first peak;
the second group of the determined lines of bearing is associated with the second peak based upon a second minimum threshold distance from the determined lines of bearing to the first peak.

17. The system of claim 16, wherein:
the instructions for identifying the first peak as one of the plurality of peaks that is disposed at the greatest number of intersecting determined lines of bearing comprise:
instructions for generating a first histogram of the determined lines of bearing, the histogram including first pixel values indicative of a number of the lines of bearing intersecting at each pixel; and
instructions for determining the first peak based on a highest first pixel value of the histogram;

the instructions for identifying the second peak as the another one of the plurality of peaks disposed at the maximum number of intersecting residual determined lines of bearing, the residual determined lines of bearing excluding the first group of the determined lines of bearing comprises:
  instructions for generating a second histogram of determined lines of bearing excluding the first group of the determined lines of bearing, the second histogram including second pixel values indicative of a second number of lines of bearing excluding the first group of the determined lines of bearing intersecting at each pixel; and
  instructions for determining a second peak based on a highest second pixel value of the second histogram.

18. The system of claim 17, wherein the instructions for generating a second histogram of determined lines of bearing excluding the first group of the determined lines of bearing comprise instructions for:
  removing the first group of the determined lines of bearing from the determined lines of bearing; and
  generating the second histogram from the determined lines of bearing remaining after removing the first group of the determined lines of bearing.

19. The system of claim 16, wherein the instructions for generating a second histogram of determined lines of bearing excluding the first group of the determined lines of bearing comprise:
  instructions for removing pixel values associated with the first group of the determined lines of bearing from the first pixel values.

20. A control system operatively coupled to a direction finding sensor of a platform and a control surface of the platform, the control system configured to:
  determine a plurality of lines of bearing, each of the plurality of lines of bearing extending from each direction finding sensor to a plurality of signal sources from at least two locations;
  determine a plurality of peaks, each of the plurality of peaks disposed at intersecting determined lines of bearing;
  identify a first peak as one of the plurality of peaks that is disposed at a maximum greatest number of intersecting determined lines of bearing;
  associate a first group of the determined lines of bearing with the first peak;
  determine a location of a first signal source of the plurality of signal sources according to the first group of the determined lines of bearing;
  create a residual group of lines of bearing that excludes the first group of determined lines of bearing;
  determine a second peak as another one of the plurality of peaks disposed at a greatest number of intersecting residual determined lines of bearing from the residual group of lines of bearing;
  associate a second group of the residual determined lines of bearing with the second peak; and
  determine a location of a second signal source using the second group of the residual determined lines of bearing.

* * * * *